United States Patent
Yang et al.

(10) Patent No.: US 9,075,474 B2
(45) Date of Patent: Jul. 7, 2015

(54) PORTABLE ELECTRONIC DEVICE AND METHOD FOR WAKING UP THE SAME FROM SLEEP MODE THROUGH TOUCH SCREEN

(75) Inventors: Shu-Hsiang Yang, Taoyuan County (TW); Chih-Chang Hsu, Taoyuan County (TW); Chung-An Chien, Taoyuan County (TW); Ming-Jer Yang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 331 days.

(21) Appl. No.: 12/609,016

(22) Filed: Oct. 30, 2009

(65) Prior Publication Data

US 2010/0134437 A1    Jun. 3, 2010

(30) Foreign Application Priority Data

Nov. 28, 2008   (TW) ............................ 97146568 A (51) Int. Cl.
G06F 1/32 (2006.01)
G06F 3/041 (2006.01)
G06F 3/045 (2006.01)
G06F 3/0488 (2013.01)

(52) U.S. Cl.
CPC ............ *G06F 3/0416* (2013.01); *G06F 1/3203* (2013.01); *G06F 3/045* (2013.01); *G06F 3/0488* (2013.01)

(58) Field of Classification Search
CPC ....... G06F 3/044; G06F 3/055; G06F 3/0412; G06F 3/0416; G06F 3/046; G06F 1/32–1/325; G06F 1/3262; G06F 1/3265; G09G 2330/02–2330/021; G09G 2330/0213; G09G 2203/04106

USPC .................................................. 345/173–178
See application file for complete search history.

(56) References Cited

U.S. PATENT DOCUMENTS

| 5,453,941 | A |   | 9/1995 | Yoshikawa |
| 5,659,154 | A |   | 8/1997 | Yoshikawa |
| 5,712,662 | A |   | 1/1998 | Miyazaki et al. |
| 5,854,451 | A | * | 12/1998 | Miyazaki et al. .......... 178/18.05 |

(Continued)

FOREIGN PATENT DOCUMENTS

| TW | 507158 | 10/2002 |
| WO | 2006133018 | 12/2006 |

OTHER PUBLICATIONS

"Search report of Europe counterpart application", issued on Jan. 4, 2010, p. 1-p. 4.

(Continued)

*Primary Examiner* — Sanghyuk Park
(74) *Attorney, Agent, or Firm* — Jianq Chyun IP Office (57) ABSTRACT

A portable electronic device including a touch screen, a micro processing unit, a central processor and a display is provided. The central processor can operate in a normal operation mode or a sleep mode. The touch screen overlays the display, and includes a first touch area, a second touch area and at least one electrode. When the central processor operates in the sleep mode and one of the first and second touch areas senses a touch, the at least one electrode generates a touch signal. The micro processing unit determines whether the touch is sensed by the first or the second touch area according to the touch signal. If the touch is sensed by the second touch area, the micro processing unit outputs a wake-up signal to the central processing unit, so as to switch the central processor from the sleep mode to the normal operation mode.

14 Claims, 6 Drawing Sheets

(56) References Cited

U.S. PATENT DOCUMENTS

| | | | |
|---|---|---|---|
| 6,054,979 A | 4/2000 | Sellers | |
| 6,476,797 B1 * | 11/2002 | Kurihara et al. | 345/173 |
| 6,504,530 B1 | 1/2003 | Wilson et al. | |
| 2002/0091952 A1 * | 7/2002 | Lin et al. | 713/300 |
| 2005/0078093 A1 | 4/2005 | Peterson, Jr. et al. | |
| 2005/0110772 A1 * | 5/2005 | Kong et al. | 345/174 |
| 2007/0008299 A1 | 1/2007 | Hristov | |
| 2008/0055256 A1 * | 3/2008 | Kwong et al. | 345/173 |
| 2008/0246723 A1 | 10/2008 | Baumbach | |
| 2008/0272826 A1 | 11/2008 | Smit et al. | |
| 2008/0277171 A1 | 11/2008 | Wright | |

OTHER PUBLICATIONS

"First Office Action of European Counterpart Application", issued on Jan. 19, 2010, p. 1-p. 5.

"Second Office Action of European Counterpart Application", issued on Jan. 27, 2011, p. 1-p. 5.

"Third Office Action of European Counterpart Application", issued on Jul. 21, 2011, p. 1-p. 5.

"Office Action of Taiwan Counterpart Application", issued on Feb. 20, 2012, p. 1-p. 5.

* cited by examiner

PORTABLE ELECTRONIC DEVICE AND METHOD FOR WAKING UP THE SAME FROM SLEEP MODE THROUGH TOUCH SCREEN

CROSS-REFERENCE TO RELATED APPLICATION

This application claims the priority benefit of Taiwan application serial No. 97146568, filed on Nov. 28, 2008. The entirety of the above-mentioned patent application is hereby incorporated by reference herein and made a part of this specification.

BACKGROUND OF THE INVENTION

1. Field of the Invention

The present invention relates to a portable electronic device and a method for waking up the same from a sleep mode. More particularly, the present invention relates to a portable electronic device and a method for waking up the same from a sleep mode through a touch screen.

2. Description of Related Art

With a quick development of technology, most of portable electronic devices apply a touch screen to improve an operation convenience thereof. Presently, the touch screens are approximately grouped into resistive touch screens, capacitive touch screens, infrared touch screens and ultrasound touch screens, etc. Since the resistive touch screen has a low cost, and a technique development thereof is relatively mature, it becomes a mainstream in development of the market.

Figure 1:
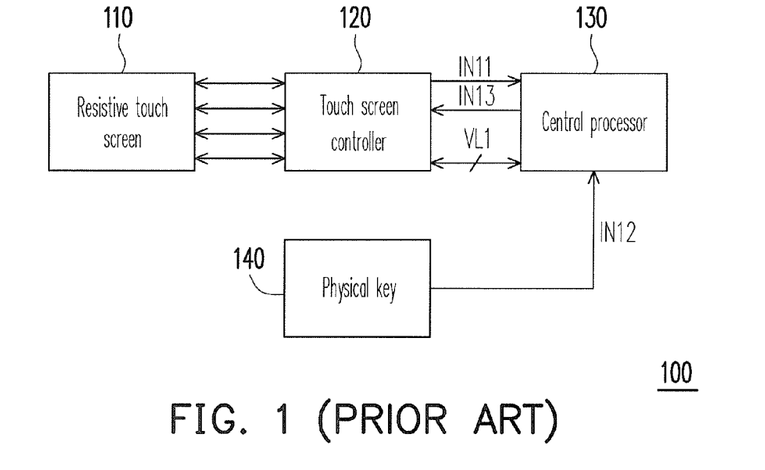
FIG. 1 is a block diagram illustrating a conventional electronic device having a touch screen.

FIG. 1 is a block diagram illustrating a conventional electronic device having a touch screen. Referring to FIG. 1, the electronic device 100 applies a touch screen controller 120 to control a resistive touch screen 110. In a normal operation mode, the touch screen controller 120 may send a plurality of scanning voltages to the resistive touch screen 110 to detect a coordinate value of a touch point. Moreover, a central processor 130 receives a read signal IN11 from the touch screen controller 120, and reads the coordinate value VL1 stored in the touch screen controller 120 to perform a corresponding operation.

On the other hand, when the central processor 130 enters a sleep mode, it can only be waked up and switched to the normal operation mode in response to an enabling signal IN12 sent from a physical key 140. The central processor 130 may send an enabling signal IN13 to the touch screen controller 120 for waiting to read the coordinate value VL1 only when the central processor 130 is in the normal operation mode. In other words, in the sleep mode, a user has to first press the physical key 140 to wake up the central processor 130, and then the central processor 130 can read the coordinate value VL1 stored in the touch screen controller 120 to perform the corresponding operation.

It should be noted that in recent years, various electronic products have a general development trend of easy operation, small-size and large screen size, and especially for the portable electronic device, a requirement for a volume and the screen size thereof is more strict. Therefore, in a plenty of the electronic products, the touch screen and a liquid crystal panel are integrated to save a space originally used for containing a keyboard or the physical key, so as to enlarge a configurable area of the screen. However, regarding a conventional electronic device, while the screen size thereof is expended, a hardware space of the physical key has to be maintained, so as to facilitate waking up the central processor.

In this case, not only the features of the small size and the large screen size of the electronic device are hard to be achieved, but also a usage complexity of the touch screen is increased.

SUMMARY OF THE INVENTION

The present invention is directed to a portable electronic device, in which a central processor in a sleep mode can be directly waked up by operating a touch screen.

The present invention is directed to a method for waking up a portable electronic device from a sleep mode through a touch screen, by which a central processor in the sleep mode can be waked up through the touch screen in a most power-saving approach.

The present invention provides a portable electronic device including a touch screen, a micro processing unit, a central processor and a display. The central processor can operate in a normal operation mode or a sleep mode. The display has a display area for displaying information. The touch screen overlays the display, and includes a first touch area overlaid on the display area of the display, a second touch area extending to outside of the display area, and at least one electrode. When the central processor is in the sleep mode and one of the first and the second touch areas senses a touch, the at least one electrode generates a touch signal. The micro processing unit is electrically connected to the at least one electrode and determines whether the touch is sensed by the first or the second touch area according to the touch signal. If the touch is sensed by the second touch area, the micro processing unit outputs a wake-up signal to the central processor, so as to switch the central processor from the sleep mode to the normal operation mode.

In an embodiment of the present invention, the portable electronic device further includes a touch screen controller electrically connected between the touch screen and the central processor. When the central processor operates in the normal operation mode, the touch screen controller transmits a plurality of scanning voltages to the touch screen to detect and obtain a coordinate value of a touch point, and sends a read signal to the central processor to make the central processor read the coordinate value of the touch point.

In an embodiment of the present invention, the at least one electrode includes a first electrode, a second electrode, a third electrode and a fourth electrode, and the touch screen includes a transparent thin film, a transparent glass, a plurality of spacers and a frame. The first and the second electrodes are disposed at two sides of the transparent thin film along a first direction. The third and the fourth electrodes are disposed at two sides of the transparent glass along a second direction. The frame is used for fixing the transparent thin film on the transparent glass. Moreover, the micro processing unit is electrically connected to the first or the second electrode, and when the central processor is in the sleep mode, the touch screen controller transmits a pull-up voltage conducted between the second and the third electrodes.

The present invention provides a method for waking up a portable electronic device from a sleep mode through a touch screen. The portable electronic device includes a central processor, a touch screen and a micro processing unit. The touch screen has a first touch area and a second touch area, and the method includes following steps. First, one of the first and the second touch areas senses a touch to generate a touch signal. Next, the micro processing unit determines whether the touch is sensed by the first or the second touch area according to the touch signal, and if the touch is sensed by the second touch area, the micro processing unit outputs a wake-up signal.

Finally, the central processor is switched from the sleep mode to a normal operation mode according to the wake-up signal.

In the present invention, the micro processing unit reads a signal of a part of the electrodes of the touch screen, so that the micro processing unit can wake up the central processor from the sleep mode according to the signal received from the touch screen.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
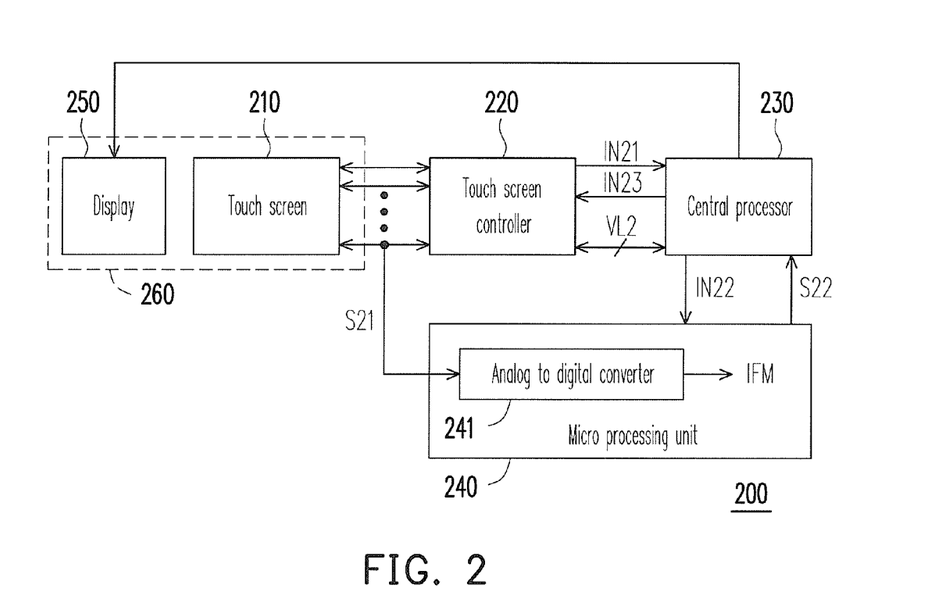
FIG. 2 is block diagram illustrating a portable electronic device according to an embodiment of the present invention.

FIG. 2 is block diagram illustrating a portable electronic device according to an embodiment of the present invention. Referring to FIG. 2, the portable electronic device 200 includes a touch screen 210, a touch screen controller 220, a central processor 230, a micro processing unit 240 and a display 250. The touch screen 210 and the display 250 form a touch display panel 260, and the touch screen 210 includes a plurality of electrodes (not shown). The micro processing unit 240 includes an analog to digital converter 241.

Regarding the whole structure, the touch screen controller 220 is electrically connected to the electrodes. Moreover, the micro processing unit 240 is electrically connected to a part of the electrodes through the analog to digital converter 241, and the control processor 230 is electrically connected to the touch screen controller 220 and the micro processing unit 240. Moreover, the portable electronic device 200 of the present embodiment is, for example, a personal digital assistant (PDA) phone, a smart phone, a satellite navigator or a PDA, etc.

In a whole operation, when the central process 230 is switched to and operates in a normal operation mode, the touch screen controller 220 transmits a plurality of scanning voltages to the touch screen 210 to detect and obtain a coordinate value VL2 of a touch point when the touch screen 210 senses a touch. On the other hand, the touch screen controller 220 can transmits a read signal IN21 to the central processor 230 to make the central processor 230 read the coordinate value VL2 of the touch point.

On the other hand, when the central processor 230 is switched to and operates in a sleep mode, the touch screen controller 220 stops transmitting the scanning voltages. Moreover, the central processor 230 now can transmit an acquisition signal IN22 to the micro processing unit 240. When the micro processing unit 240 receives the acquisition signal IN22, the analog to digital converter 240 converts a signal received from a part of the electrodes into a touch information IFM, and the micro processing unit 240 determines whether or not to output a wake-up signal S22 to the central processor 230 according to the touch information IFM.

Accordingly, when the central processor 230 in the sleep mode receives the wake-up signal S22, it can be waked up and switched to the normal operation mode. Comparatively, the central processor 230 in the normal operation mode can send an enabling signal IN23 to the touch screen controller 220, so as to read the coordinate value VL2 of the touch point on the touch screen 210 through the touch screen controller 220.

In other words, a user can directly wake up the central processor 230 of the portable electronic device 200 by touching a specific region of the touch screen 210. Therefore, the portable electronic device 200 can be normally operated without applying a physical key, so that a screen size of the portable electronic device 200 can be effectively expended, which avails miniaturization of the portable electronic device 200.

Figure 3:
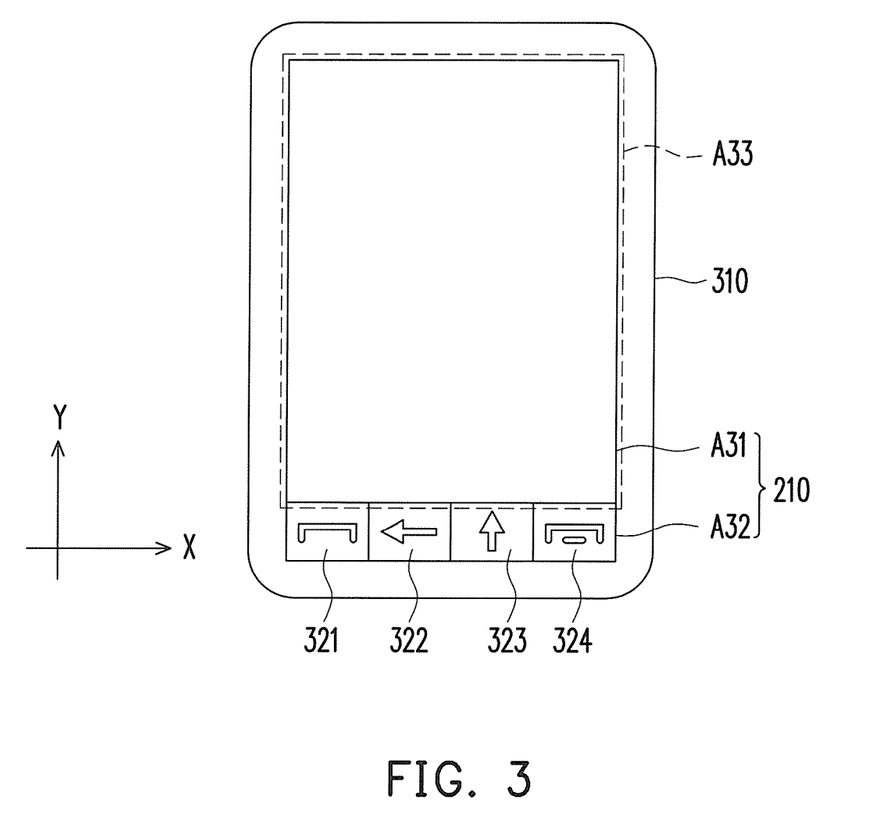
FIG. 3 is a schematic diagram illustrating an appearance of a portable electronic device of FIG. 2.

For example, FIG. 3 is a schematic diagram illustrating an appearance of the portable electronic device of FIG. 2. Referring to FIG. 3, the portable electronic device 200 further includes a housing 310 and a plurality of touch keys 321, 322, 323 and 324. The housing 310 is used for containing the micro processing unit 240, the central processor 230 and the touch screen controller 220. The touch screen 210 is disposed on a surface of the housing 310 and is overlaid on the display 250. In the present embodiment, the touch screen 210 has a first touch area A31 and a second touch area A32, and the display 250 has a display area A33 used for displaying information. The first touch area A31 of the touch screen 210 is overlaid on the display area A33 of the display 250, and the second touch area A32 of the touch screen 210 extends to outside of the display area A33. Moreover, the touch keys 321-324 are arranged on the second touch area A32 of the touch screen 210.

Referring to FIG. 2 and FIG. 3, in the sleep mode, the touch screen controller 220 does not transmit the scanning voltages to the touch screen 210, though there still has a pull-up resistance (which is described later with reference of FIG. 9) connected to a part of the electrodes on the touch screen 210. Therefore, when the first touch area A31 or the second touch area A32 senses a touch, such part of the electrodes can still generate a corresponding signal. In the present embodiment, whether the central processor 230 is waked up is determined according to the corresponding signal (i.e. a touch signal S21) generated by the electrodes. In other words, when the first touch area A31 or the second touch area A32 senses a touch, a part of the electrodes generates the touch signal S21. The analog to digital converter 241 of the micro processing unit 240 converts the touch signal S21 into the touch information IFM, and the micro processing unit 240 can determine whether the touch is sensed by the first touch area A31 or the second touch area A32 according to the touch information IFM. If the micro processing unit 240 determines that the touch is sensed by the second touch area A32, it represents that one of the touch keys 321-324 is pressed, and therefore the micro processing unit 240 outputs the wake-up signal S22 to the central processor 230.

It should be noted that a division of the first touch area A31 and the second touch area A32, i.e. the arrangement position of the touch keys 321-324, correspondingly relates to a judgement mechanism of the micro processing unit 240. In the follow content, a resistive touch screen is taken as an example for description.

Figure 4:
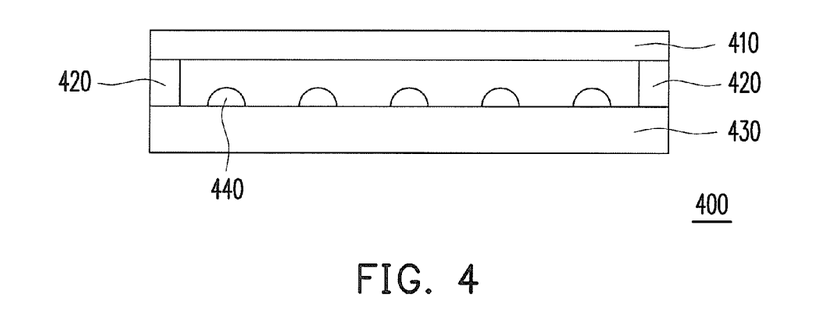
FIG. 4 is cross-sectional view of a resistive touch screen.
Figure 5:
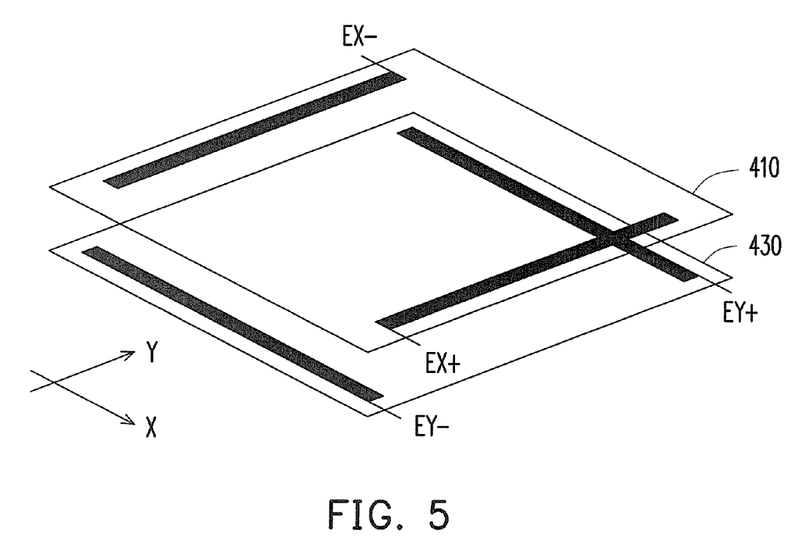
FIG. 5 is an explosion diagram of a resistive touch screen.

FIG. 4 is cross-sectional view of a resistive touch screen, and FIG. 5 is an explosion diagram of a resistive touch screen. Referring to FIG. 4, the resistive touch screen 400 includes a transparent thin film 410, a frame 420, a transparent glass 430 and a plurality of spacers 440. The spacers 440 are disposed between the transparent thin film 410 and the transparent glass 430 to form a gap between the transparent thin film 410 and the transparent glass 430. Moreover, the frame 420 is disposed around the transparent glass 430 to fix the transparent thin film 410 on the transparent glass 430.

Moreover, as shown in FIG. 5, the resistive touch screen 400 applies a four-wire-sensing technique, so that electrodes EX+ and EX− are disposed at two sides of the transparent thin film 410, and electrodes EY+ and EY− are disposed at two sides of the transparent glass 430. The electrodes EX+ and EX− are disposed on the transparent thin film 410 along a Y-axis direction, and the electrodes EY+ and EY− are disposed on the transparent glass 430 along an X-axis direction, wherein the X-axis direction is substantially perpendicular to the Y-axis direction.

Generally, when no press is exerted to the resistive touch screen 400, the spacers 410 space the transparent thin film 410 and the transparent glass 430 to isolate the upper and lower conductive layers of the resistive touch screen 400. However, when a finger or a stylus presses the transparent thin film 410, the transparent thin film 410 is conducted to the transparent glass 430 to generate a potential difference.

Figure 6:
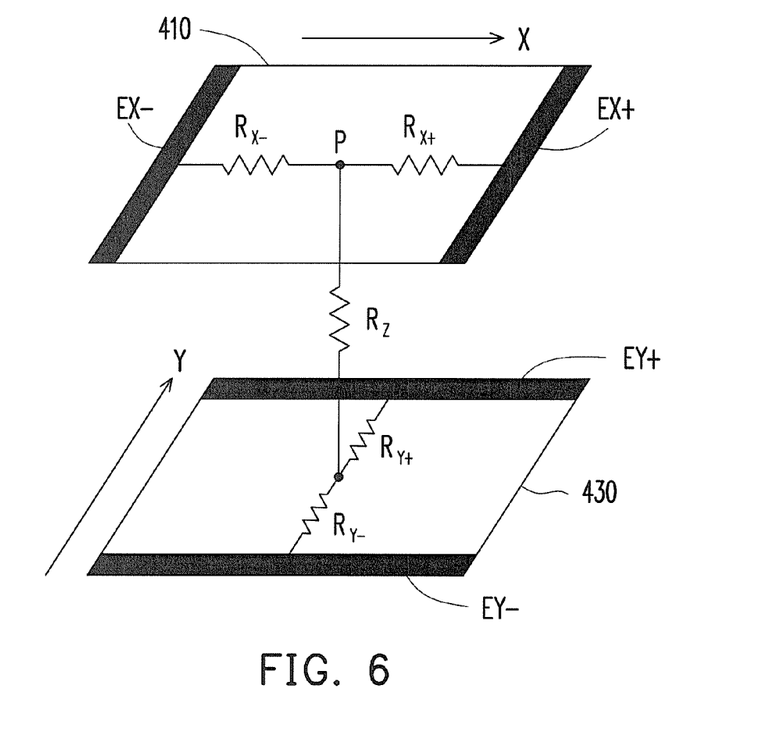
FIG. 6 is a structural diagram of a pressed resistive touch screen.
Figure 7:
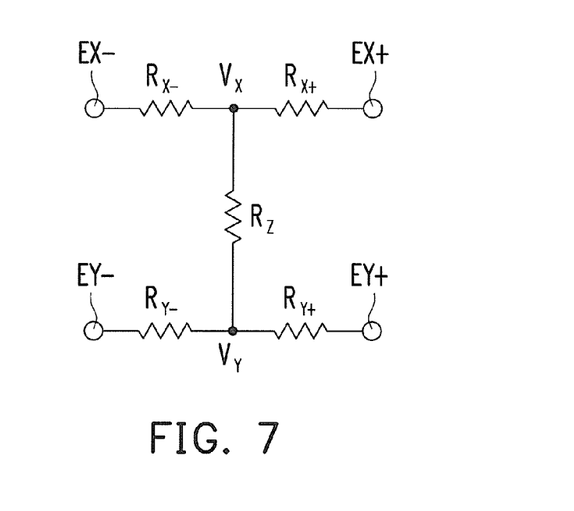
FIG. 7 is an equivalent circuit diagram of a pressed resistive touch screen.

For example, FIG. 6 is a structural diagram of a pressed resistive touch screen, and FIG. 7 is an equivalent circuit diagram of the pressed resistive touch screen. As shown in FIG. 6, when a touch point P of the resistive touch screen 400 is pressed, a press resistance $R_Z$ is generated between the transparent thin film 410 and the transparent glass 430, and the transparent thin film 410 and the transparent glass 430 are mutually conducted. Moreover, the resistive touch screen 400 can respectively generate resistances $R_{X+}$, $R_{X-}$, $R_{Y+}$ and $R_{y-}$ along the X-axis direction and the Y-axis direction based on the touch point P. Therefore, the equivalent circuit of the resistive touch screen 400 is now as that shown in FIG. 7, wherein a voltage difference between voltages $V_X$ and $V_Y$ is the potential difference generated when the transparent thin film 410 and the transparent glass 430 are mutually conducted.

In the following content, an operation mechanism of the touch screen controller 220 under the normal operation mode, and how the micro processing unit 240 judges the signal sent from the resistive touch screen 400 to wake up the central processor 230 from the sleep mode to the normal operation mode are respectively described according to a circuit characteristic of the resistive touch screen shown in FIG. 7.

In allusion to the four-wire-sensing technique, the position of the touch point P is determined according to a method that two points can determine one position. Therefore, when the touch screen controller 220 is switched to the normal operation mode, the voltages $V_X$ and $V_Y$ can be detected by exerting the scanning voltages. Comparatively, after the touch screen controller 220 obtains the voltages $V_X$ and $V_Y$, the voltages $V_X$ and $V_Y$ are calculated and converted into the coordinate value of the touch point P by the touch screen controller 220.

Figure 8A:
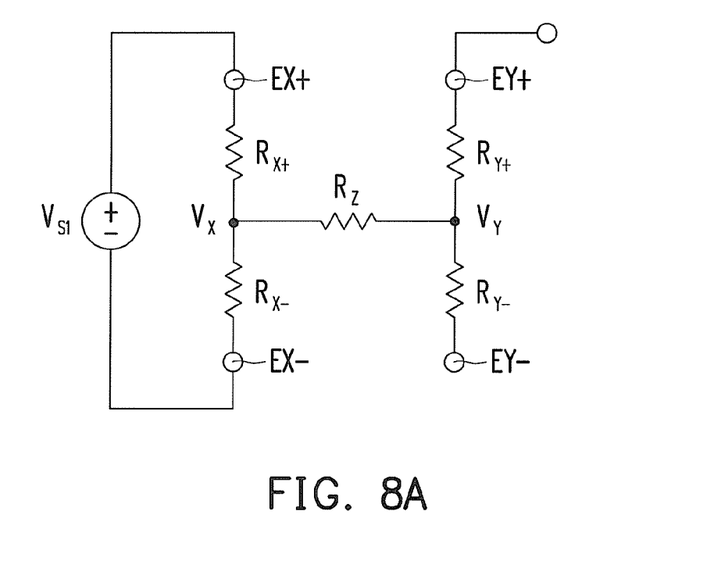
FIG. 8A and FIG. 8B are equivalent circuit diagrams of a resistive touch screen exerted with scanning voltages.
Figure 8B:
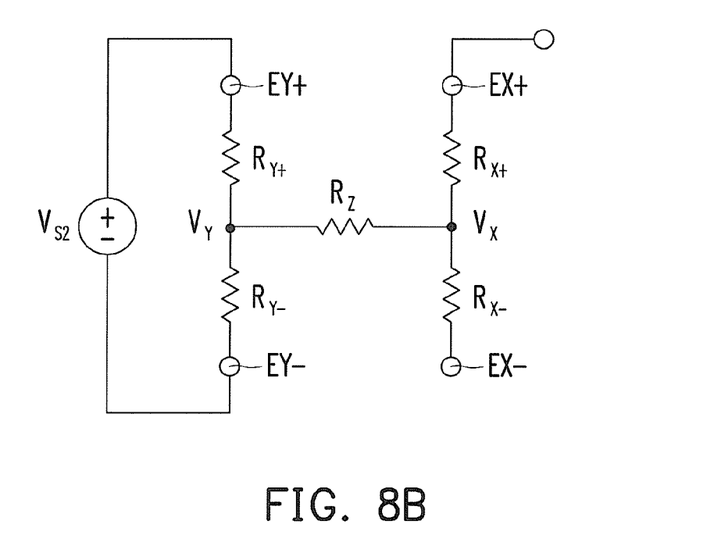

For example, FIG. 8A and FIG. 8B are equivalent circuit diagrams of a resistive touch screen applied with the scanning voltages. Under the normal operation mode, first, as shown in FIG. 8A, the touch screen controller 220 applies a scanning voltage $V_{S1}$ between the electrodes EX+ and EX−, and detects the voltage $V_Y$ through the electrode EY+. Then, as shown in FIG. 8B, the touch screen controller 220 applies a scanning voltage $V_{S2}$ between the electrodes EY+ and EY−, and detects the voltage $V_X$ through the electrode EX+. It should be noted that the touch screen controller 220 can swiftly apply the scanning voltages $V_{S1}$ and $V_{S2}$ alternately, so as to immediately convert the detected voltages $V_X$ and $V_Y$ into the coordinate value of the touch point P.

Figure 9:
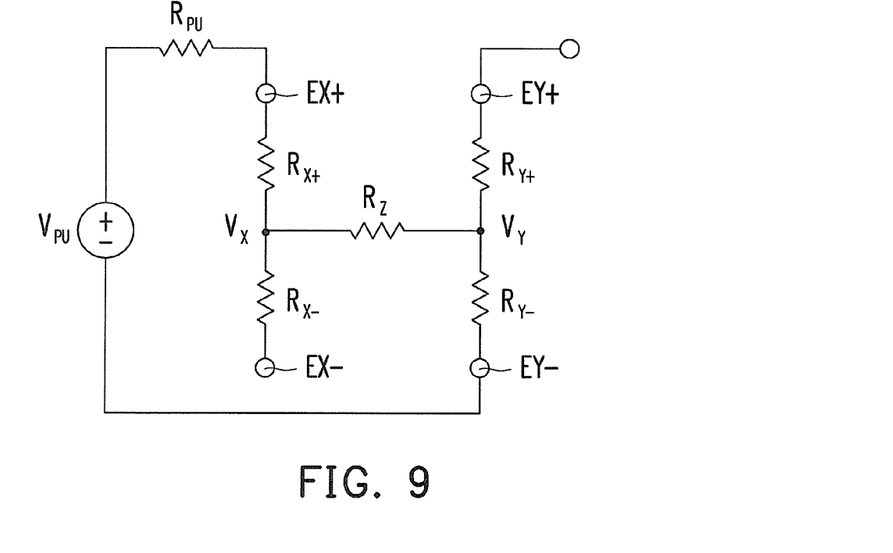
FIG. 9 is an equivalent circuit diagram of a resistive touch screen exerted with a pull-up voltage.

On the other hand, when the touch screen controller 220 is switched to the sleep mode, the touch screen controller 220 stops transmitting the scanning voltages $V_{S1}$ and $V_{S2}$. Moreover, as shown in FIG. 9, the touch screen controller 220 can transmit a pull-up voltage $V_{PU}$ conducted between the electrode EX+ and the electrode EY−. The touch screen controller 220 transmits the pull-up voltage $V_{PU}$ to the electrode EX+ through a resistance $R_{PU}$. It should be noted that if now the micro processing unit 240 is electrically connected to the electrode EX−, a voltage $V_{EX-}$, derived by the following equation (1), can be detected and obtained.

$$V_{EX-} = \frac{R_Z + R_{Y-}}{R_{PU} + R_{X+} + R_Z + R_{Y-}} \times V_{PU} \qquad (1)$$

Referring to FIG. 3 and FIG. 9, since the touch keys 321-324 are arranged in parallel along the X-axis direction, and are closed to the electrode EY− of the touch screen 400, when one of the touch keys 321-324 is pressed, the resistance $R_{Y-}$ generated along the Y-axis direction is smaller than that generated when a region outside the touch keys 321-324 is pressed, and the greater a pressing force is, the smaller the $R_Z$ is. Accordingly, the micro processing unit 240 can set a corresponding predetermined voltage information in internal thereof according to the equation (1) and variations of the resistances $R_Z$ and $R_{Y-}$. By such means, when the analog to digital converter 241 converts the voltage $V_{EX-}$ (i.e. the touch signal S21) generated by the second touch area A32 into the touch information IFM according to the acquisition signal IN22, the micro processing unit 240 can compare the touch information IFM to the predetermined voltage information, and determine whether or not to output the wake-up signal S22 according to a comparison result thereof. For example, if the comparison result shows that the voltage $V_{EX-}$ corresponding to the touch information IFM is determined to be less than, greater than or equal to a predetermined voltage, the micro processing unit 240 outputs the wake-up signal S22. Conversely, the micro processing unit 240 does not output the wake-up signal S22.

On the other hand, if the micro processing unit 240 is electrically connected to the electrode EX+, the voltage $V_{EX+}$, derived by the following equation (2), can be detected and obtained:

$$V_{EX+} = \frac{R_{X+} + R_Z + R_{Y-}}{R_{PU} + R_{X+} + R_Z + R_{Y-}} \times V_{PU} \qquad (2)$$

Now, as that shown in FIG. 9, limited to the arrangement position of the touch keys 321-324, the resistance $R_{Y-}$ is smaller than a resistance generated when a region outside the touch keys 321-324 is pressed, and the greater the pressing force is, the smaller the $R_Z$ is. Therefore, the micro processing unit 240 can set a corresponding predetermined voltage information in internal thereof according to the equation (2) and variations of the resistances $R_Z$, $R_{X+}$ and $R_{Y-}$.

In other words, the predetermined voltage information set by the micro processing unit 240 can be varied according to different electrodes read by the micro processing unit 240 and different arrangement position of the touch keys. Therefore, those skilled in the art can correspondingly change the predetermined voltage information of the micro processing unit in case that the electrode read by the micro processing unit or the arrangement position of the touch keys is changed, and therefore the micro processing unit can determine whether or not to output the wake-up signal according to the signal sent from the touch screen.

Figure 10:
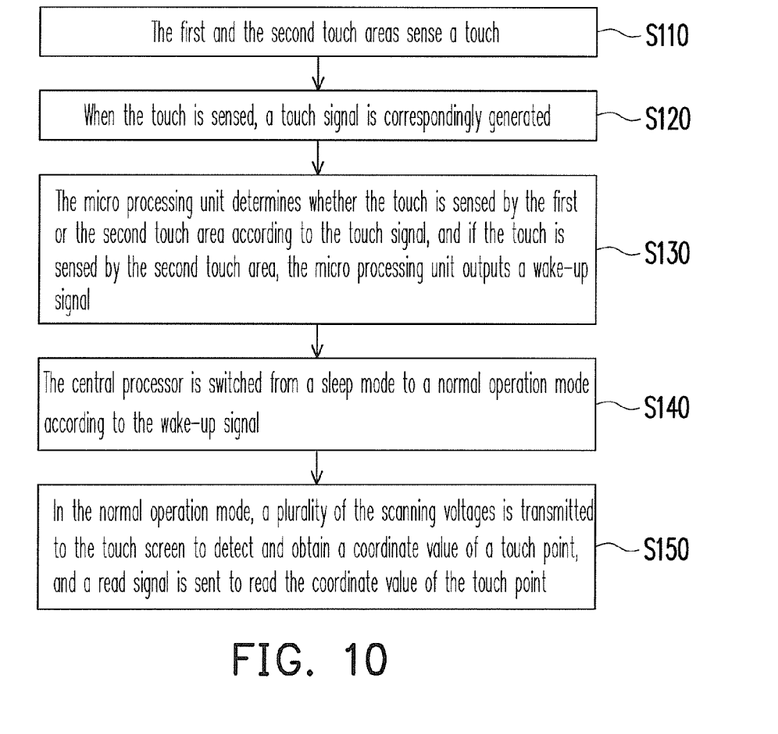
FIG. 10 is a flowchart illustrating a method for waking up a portable electronic device from a sleep mode through a touch screen according to an embodiment of the present invention.

According to another aspect, FIG. 10 is a flowchart illustrating a method for waking up a portable electronic device from a sleep mode through a touch screen according to an embodiment of the present invention, wherein the portable electronic device has a central processor, a touch screen and a micro processing unit, and the touch screen has a first touch area and a second touch area. Referring to FIG. 10, in step S110, the first and the second touch areas sense a touch. Next, in step S120, when the touch is sensed, a touch signal is correspondingly generated, and in step 5130, the micro processing unit determines whether the touch is sensed by the first or the second touch area according to the touch signal, and if the touch is sensed by the second touch area, the micro processing unit outputs a wake-up signal. By such means, in step 5140, the central processor is switched from a sleep mode to a normal operation mode according to the wake-up signal. Moreover, in step S150, in the normal operation mode, a plurality of the scanning voltages is transmitted to the touch screen to detect and obtain a coordinate value of a touch point, and a read signal is sent to read the coordinate value of the touch point. Detailed detection method of the present embodiment has been described in the aforementioned embodiments, and therefore detailed description thereof is not repeated.

In summary, in the present invention, the micro processing unit reads the signal of a part of the electrodes of the touch screen, so that the micro processing unit can wake up the central processor in the sleep mode according to the signal received from the touch screen. By such means, the touch screen of the portable electronic device can normally operate without applying the physical key, so that the screen size of the portable electronic device can be effectively expended, which avails miniaturization of the portable electronic device. On the other hand, since the user can directly wake up the central processor through the touch screen, the usage complexity of the touch screen can be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising:
   a central processor, capable of operating in a sleep mode and a normal operation mode;
   a display, having a display area for displaying information;
   a touch screen, overlaid on the display and having a first touch area, a second touch area, a first electrode extending from the first touch area to the second touch area along a first direction, and a second electrode extending along a second direction substantially perpendicular to the first direction, wherein the first touch area and the second touch area are respectively formed by a part of the touch screen, the first touch area is electrically connected to the second touch area through the first electrode, and the second touch area extends along the second direction and is close to the second electrode; and
   a micro processing unit, electrically connected to the first electrode, wherein when the central processor is operated in the sleep mode, the micro processing unit is for:
   detecting a touch signal from the first electrode;
   comparing a voltage value corresponding to the touch signal with a predetermined value to obtain a comparison result;
   determining which one of the first touch area and the second touch area senses a touch according to the comparison result; and
   outputting a wake-up signal to the central processor to switch the central processor from the sleep mode to the normal operation mode when the second touch area senses the touch,
   and when the central processor is operated in the sleep mode and the first touch area senses the touch, the micro processing unit does not output the wake-up signal.

2. The portable electronic device as claimed in claim 1, wherein the portable electronic device further comprises a touch screen controller which is electrically connected between the touch screen and the central processor, when the central processor operates in the normal operation mode, the touch screen controller alternately transmits a scanning voltage to the touch screen, and when the central processor operates in the sleep mode, the touch screen controller stops transmitting the scanning voltage and transmits a pull-up voltage conducted between the first electrode and the second electrode.

3. The portable electronic device as claimed in claim 2, wherein the micro processing unit outputs the wake-up signal to the central processor through an inter-integrated circuit (I2C) bus.

4. The portable electronic device as claimed in claim 2, further comprising:
   a housing, for containing the micro processing unit, the central processor and the touch screen controller, wherein the touch screen is disposed on a surface of the housing.

5. The portable electronic device as claimed in claim 1, wherein the micro processing unit comprises:
   an analog to digital converter, electrically connected to the first electrode, for converting the touch signal into a touch information, wherein the micro processing unit determines whether the touch is sensed by the first or the second touch area by comparing the touch information with the predetermined value.

6. The portable electronic device as claimed in claim 1, wherein the touch screen is a resistive touch screen.

7. The portable electronic device as claimed in claim 1, wherein the touch screen comprises:
   a third electrode and a fourth electrode;
   a transparent thin film, wherein the first and the third electrodes are disposed at two sides of the transparent thin film along the first direction;
   a transparent glass, wherein the second and the fourth electrodes are disposed at two sides of the transparent glass along the second direction;

a plurality of spacers, disposed between the transparent thin film and the transparent glass; and a frame, disposed around the transparent glass, for fixing the transparent thin film on the transparent glass.

8. The portable electronic device as claimed in claim 1, wherein the touch screen further comprises a plurality of touch keys disposed along the second direction in parallel.

9. The portable electronic device as claimed in claim 1, which is a PDA phone, a smart phone, a satellite navigator or a PDA.

10. The portable electronic device of claim 1, wherein the micro processing unit further comprises an analog to digital converter which converts the touch signal from the first electrode into a digital touch information, and the micro processing unit determines whether the touch is sensed by the first area or the second area base on the digital touch information.

11. A method for waking up a portable electronic device from a sleep mode, the portable electronic device having a micro processing unit, a central processor, which is capable of operating in the sleep mode and a normal operation mode, and a touch screen having a first touch area, a second touch area, a first electrode extending from the first touch area to the second touch area along a first direction, and a second electrode extending along a second direction substantially perpendicular to the first direction, wherein the first touch area and the second touch area are respectively formed by a part of the touch screen, the first touch area is electrically connected to the second touch area through the first electrode, the second touch area extends along the second direction and is close to the second electrode, and the method comprises:

detecting a touch signal from the first electrode;

when the central processor is operated in the sleep mode, the micro processing unit is for:

comparing a voltage value corresponding to the touch signal with a predetermined value to obtain a comparison result;

determining which one of the first touch area and the second touch area senses a touch according to the comparison result;

outputting a wake-up signal to the central processor when the second touch area senses the touch; and switching the central processor from the sleep mode to the normal operation mode according to the wake-up signal; and do not output the wake-up signal when the central processor is operated in the sleep mode and the first touch area senses the touch.

12. The method as claimed in claim 11, further comprising:

transmitting a plurality of scanning voltages to the touch screen to detect and obtain a coordinate value of a touch point in the normal operation mode, and sending a read signal to read the coordinate value of the touch point.

13. The method as claimed in claim 11, wherein the step of outputting the wake-up signal according to the touch signal comprises:

converting the touch signal into a touch information; and determining whether the touch is sensed by the first or the second touch area by comparing the touch information with the predetermined value.

14. The method as claimed in claim 11, wherein the touch screen is a resistive touch screen.

* * * * *